United States Patent
Watanabe

[19]

[11] Patent Number: 5,911,489
[45] Date of Patent: Jun. 15, 1999

[54] OPTICAL LIGHTING SYSTEM

[75] Inventor: Fumio Watanabe, Saitama, Japan

[73] Assignee: Fuji Photo Optical Co., Ltd., Saitama, Japan

[21] Appl. No.: 09/045,835

[22] Filed: Mar. 23, 1998

[30] Foreign Application Priority Data

Mar. 24, 1997 [JP] Japan ..................................... 9-090104

[51] Int. Cl.⁶ .................................................. G03B 21/28
[52] U.S. Cl. ............................... 353/98; 353/99; 353/31; 362/298; 349/67
[58] Field of Search .................................. 353/98, 99, 31, 353/33, 34, 37, 102; 362/297, 298, 302, 346, 347; 349/67, 62, 61

[56] References Cited

U.S. PATENT DOCUMENTS

| | | | |
|---|---|---|---|
| 4,422,135 | 12/1983 | McCamy | 362/346 |
| 5,142,387 | 8/1992 | Shikama et al. | 362/298 |
| 5,192,962 | 3/1993 | Nishida et al. | 353/98 |
| 5,217,299 | 6/1993 | Yoshida et al. | 362/298 |
| 5,408,363 | 4/1995 | Kano | 362/346 |
| 5,491,525 | 2/1996 | Yamasaki et al. | 353/98 |
| 5,613,767 | 3/1997 | Hamanaka et al. | 362/298 |
| 5,833,341 | 11/1998 | Kimura et al. | 353/98 |

FOREIGN PATENT DOCUMENTS 4-174422  6/1992  Japan ........................ 353/98

*Primary Examiner*—William C. Dowling
*Attorney, Agent, or Firm*—Young & Thompson

[57] ABSTRACT

A lighting system comprises a light source and a reflector arrangement which comprises a concave first reflection mirror having an aspherical surface for reflecting and directing forward light beams emanating laterally and radially back from the light source forward along an optical axis, an annular concave second reflection mirror having an aspherical surface for reflecting and directing light beams emanating laterally and radially forward from the light source toward a specified point, and a third reflection mirror disposed near the specified point and having an aspherical surface for reflecting and directing forward the light beams reflected by the concave second reflection mirror along the optical axis.

18 Claims, 6 Drawing Sheets

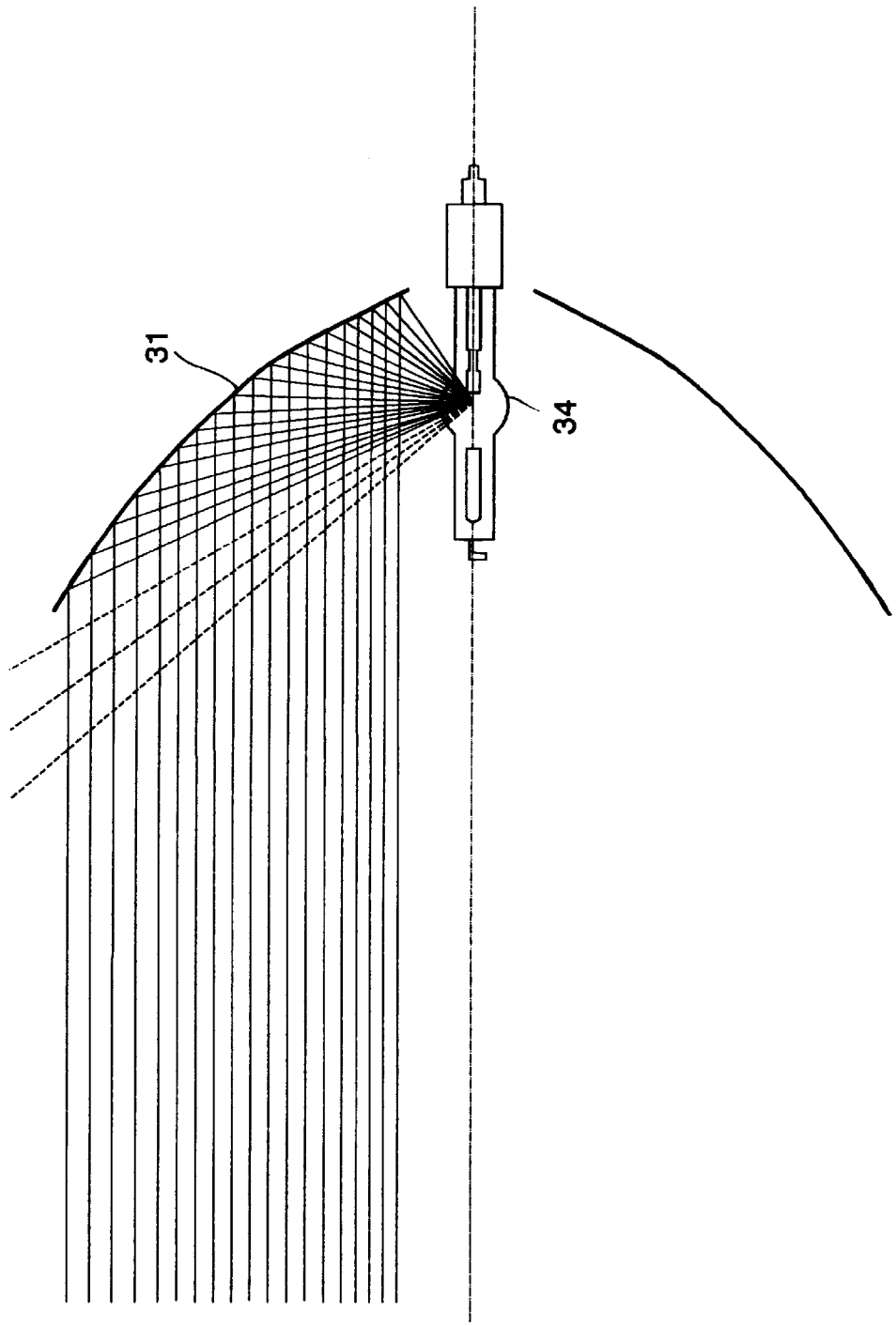
FFIG. 6 PRIOR ART

OPTICAL LIGHTING SYSTEM

BACKGROUND OF THE INVENTION

1. Field of the Invention

The invention relates to an optical lighting system having a discharge tube, such as a xenon lamp and a metal halide lamp, as a light source and, more particularly, to an optical lighting system suitable for a video projector equipped with liquid crystal display devices.

2. Description of Related Art

There has been on the market what is called a video projector of the type equipped with liquid crystal display devices for forming images to be projected onto a screen. Such a video projector is equipped with a lighting system typically comprising a lighting system, an integrating device for providing an uniform quantitative distribution of light beams generated by the light source device and an optical system for lighting liquid crystal display panels by the uniform light beams. The light source device includes a discharge tube such as a xenon lamp and a metal halide lamp and a reflector, such as a parabolic reflector, an elliptical reflector and a hyperbolic reflector, for directing light beams to a desired direction.

A xenon lamp or a metal halide lamp has a spatial distribution characteristic such as shown in FIG. 5. As seen in FIG. 5, the majority of light beams generated by the discharge tube centralize within a spatial extent from an angle of 20 degrees to an angle of 140 degrees with respect to an electrode axis which is perpendicular to an optical axis of the light source device. In other words, the quantity of light beams which are parallel to and travel along the optical axis is not always large. In order to reflect light beams emanating from the discharge tube as much as possible, a large size of reflector is needed.

Even if a large sized reflector having a parabolic reflective surface as shown in FIG. 6 by way of example is employed, a lack of reflected light beams occurs near an optical axis of the light source device and the density of reflected light beams declines as the lateral distance from the optical axis becomes long, which always brings about aggravation of light condensing efficiency. Further, optical parts such as a condenser lens and an integrator associated with a large sized reflector in a light source device which must be large in size impose various constraint on designs of a compact lighting optical system and optical projection system for a video projector equipped with liquid crystal display plates.

SUMMARY OF THE INVENTION

It is accordingly an object of the invention to provide a lighting system having a compact reflector arrangement which yields an improved coefficient of utilization of light.

It is another object of the invention to provide an optical projection system equipped with a lighting system which yields an improved coefficient of utilization of light.

The foregoing objects of the invention are accomplished by providing a lighting system for reflecting and directing light beams emanating from a light source forward by means of a reflector arrangement which comprises three quadric reflection mirrors arranged on an optical axis of the lighting system. Specifically, a first reflection mirror has a concave reflective surface such as a paraboloid, a second reflection mirror has a concave reflective surface such as an ellipsoid, and a third reflection mirror has a convex reflection surface such as a paraboloid. The light source such as a discharge lamp is disposed on the optical axis and generates light beams radially in all-around directions. The concave first reflection mirror has a generally hemispherical shape and is disposed behind the light source to reflect and direct light beams emanating laterally and backward from the light source toward forward. The concave second reflection mirror, which is preferably integral with the concave first reflection mirror and extends continuously forward from the concave first reflection mirror, reflects and directs or focus light beams emanating laterally and obliquely forward from the light source toward a point near or on the optical axis. The convex third reflection mirror positioned on the optical axis near the point reflects and directs the light beams reflected by the concave second reflection mirror.

In a preferred embodiment of the invention, the concave first reflection mirror has a parabolic reflective surface whose focus is positioned so as to coincide approximately with the light source of the lighting system. The concave second reflection mirror has an elliptical reflective surface with one of its focuses positioned so as to coincide with the focus of the paraboloid of the concave first reflection mirror and another focus positioned at a specified point on or near the optical axis at which the focus of a parabolic reflective surface of the concave third reflection mirror is. The lighting system reflects part of the light beams emanating in laterally and radially backward from the discharge lamp 4 forward and turns them to parallel light beams and part of the remaining light beams emanating laterally and radially forward to converge them toward a specified point and reflects them forward in directions parallel to the optical axis. As a result, the lighting system collect and uses effectively light beams emanating in substantially all-around radial directions from the light source.

The concave first and second reflective reflection mirrors may be integrated as one whole, which is always desirable for decreasing manufacturing costs of the lighting system. This integral structure of the concave first and second reflection mirrors is easy assembled to the lighting system and an image projection system such as an LCD video projector. Designing and manufacturing a parabolic reflection mirror and an elliptic reflection mirror is not accompanied by any troublesome task and consequently the reflector arrangement comprised of a simple combination of three simple reflection mirrors is easily structured and manufactured at decreased costs.

The lighting system may be equipped with an integrator positioned in front thereof to provide an uniform quantitative distribution of light beams, which yields an improvement of lighting quality. The lighting system is installed to an optical projection system for, for example, an LCD video projector with an effect of significantly improving image quality.

BRIEF DESCRIPTION OF THE DRAWINGS

The above and other objects and features of the present invention will be understood from the following description of a specific embodiment thereof when considering in conjunction with the accompanying drawings, in which same reference numerals have been used to denote the same or like parts or elements throughout the drawings and wherein:

FIG. 6 is a diagrammatic side view of a basic structure of a prior art light source device.

DETAILED DESCRIPTION OF THE SPECIFIC EMBODIMENT

In the following description, the term "aspherical reflective surface" used hereafter shall mean and refer to a surface defined by revolving a segment of a curve of second order, such as a parabola, a hyperbola and an elliptic curve, about the axis of the curve or a surface defined by revolving a segment of a curve of second order, such as a parabola, a hyperbola and an elliptic curve about an axis of revolution which intersects the curve at a focus.

Figure 1:
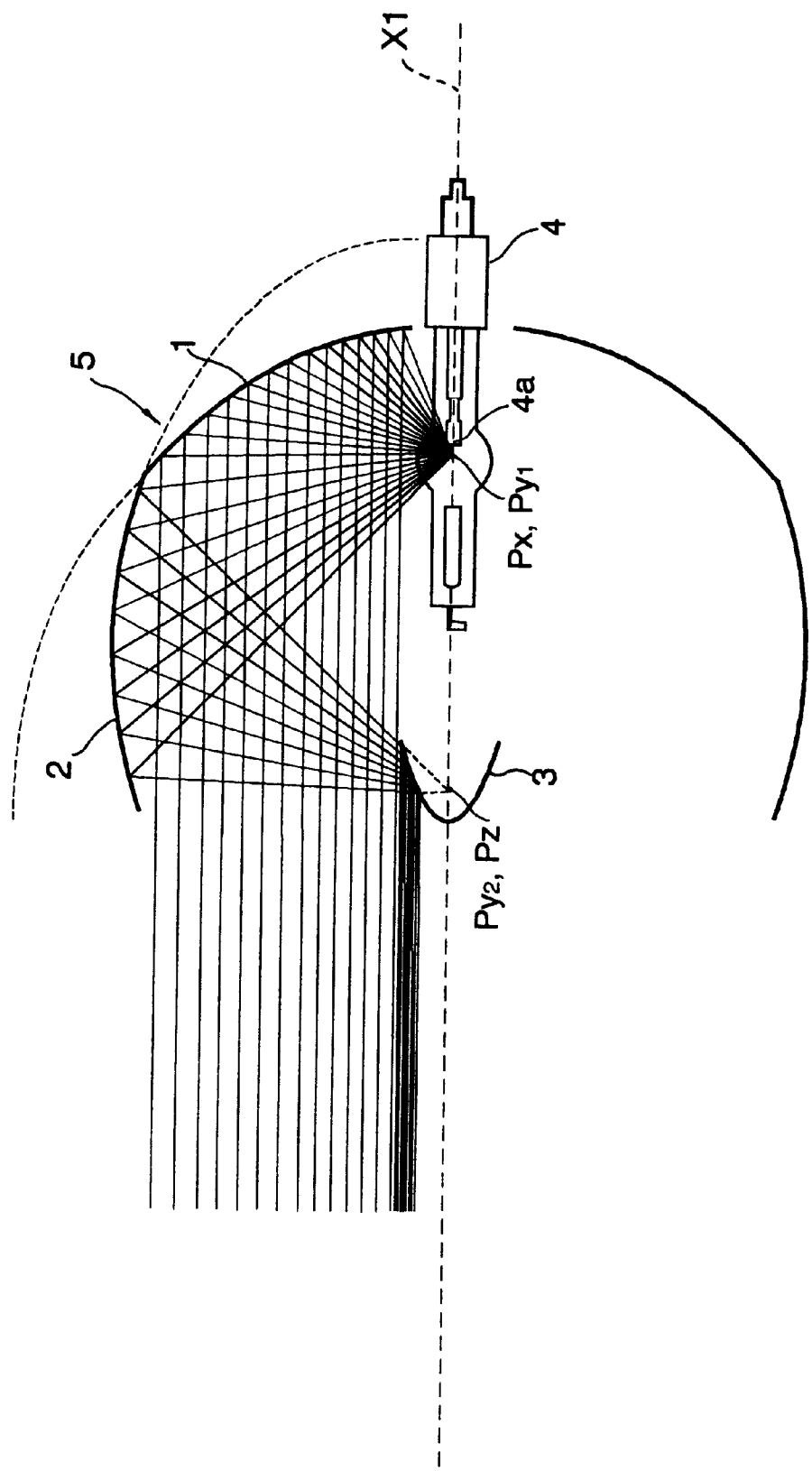
FIG. 1 is a diagrammatic side view of a basic structure of a lighting system in accordance with an embodiment of the present invention.

Referring to the drawings in detail, in particular, to FIG. 1 showing a lighting system in accordance with an embodiment of the invention, the lighting system 10 comprises a discharge lamp 4 such as a xenon lamp and a metal halide lamp and a reflector arrangement 5. The reflector arrangement consists of three quadric reflection mirrors, namely a generally hemispherical concave first reflection mirror 1, an annular concave second reflection mirror 2 formed continuously from and integrally with the concave first reflection mirror 1, and a convex third reflection mirror 3, all of which are arranged on an optical axis X1 of the lighting system 10. Specifically, the concave first reflection mirror 1 has a parabolic reflective surface having a focus PX at a light source 4a of the discharge lamp 4 to reflect and direct forward part of light beams emanating laterally and radially back from the discharge lamp 4 in directions parallel to the optical axis X1. The annular concave second reflection mirror 2 has an elliptical reflective surface enclosed by an extended surface of the parabolic reflective surface of the concave first reflection mirror 1 and having focuses PY1 and PY2 on the optical axis X1, one of which coincides with the focus PX of the parabolic reflective surface of the concave first reflection mirror 1. This annular concave second reflection mirror 2 reflects and directs part of the light beams emanating laterally and radially forward from the discharge lamp 4 at the focus PY1 towards the other focus PY2. The convex third reflection mirror 3, which is sized and positioned so as to face the concave second reflection mirror and not to get in the way of the parallel light beams reflected forward by the concave first reflection mirror 1, has a parabolic reflective surface whose focus PZ coincides with the focus PY2 of the elliptical reflective surface of the annular concave second reflection mirror 2. This convex third reflector 3 reflects and direct the light beams reflected by the annular concave second reflection mirror 2 towards the focus PY2 (PZ) forward in directions parallel to the optical axis X1.

In the lighting system 10 having the discharge lamp 4 whose light source 4a is positioned at the focus PX of the paraboloid of the concave first reflection mirror 1 coincidence with the focus PY1 of the ellipsoid of the annular concave second reflection mirror 2, the light beams emanating laterally and radially back from the discharge lamp 4 are partly reflected and directed forward by the concave first reflection mirror 1 in directions parallel to the optical axis X1, and partly reflected by the concave first reflection mirror 1 so as to converge at the focus PY2 of the ellipsoid and further reflected forward by the convex third reflection mirror 3 whose paraboloid has the focus PZ coincidence with the focus PY2 of the ellipsoid of the concave second reflection mirror 2 in directions parallel to the optical axis X1.

The facing arrangement of the concave second reflection mirror 2 and the convex third reflection mirror 3 provides overall compactness of the lighting system 10, and hence of an image projection system (see FIGS. 3 and 4) equipped with the lighting system 10, with an effect of collecting effectively light beams emanating laterally forward from the discharge lamp 4 and incorporating them into the image projection system, which is always desirable for increasing the quantity of available light beams and saving consumption of electric power. Designing and producing a parabolic reflection mirror and an elliptical reflection mirror is not accompanied by any troublesome task, so that the reflector arrangement 5 comprised of a simple combination of three simple reflection mirror surfaces is easily structured. The integral formation of the concave first and second reflection mirrors 1 and 2 is easily assembled to the lighting system 10 or to the image projection system.

The concave second reflection mirror 2 and the convex third reflection mirror 3 facing each other may be comprised a high-order aspherical reflective surface to collect light beams emanating from the light source element and its environs of the discharge lamp 4 and to turn them into parallel light beams.

Figure 2:
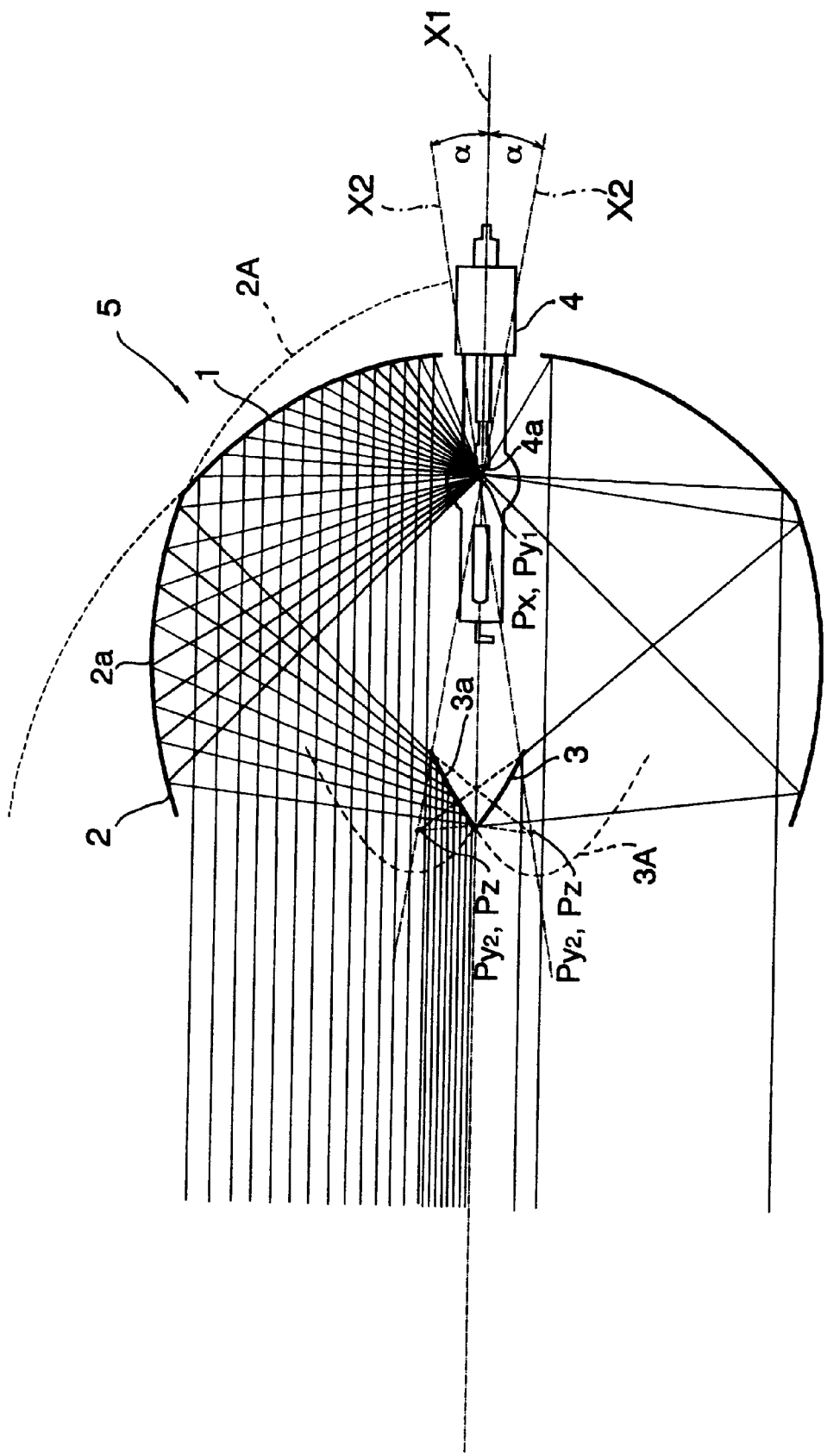
FIG. 2 is a diagrammatic side view of a basic structure of a lighting system in accordance with another embodiment of the invention.

FIG. 2 shows a lighting system 10 in accordance with another embodiment of the invention, in which only one cross-sectional plane including axes X1 and X2 is shown for simplicity. The lighting system 10 includes a reflector arrangement 5 consisting of three aspherical reflection mirrors, namely a generally hemispherical concave first reflection mirror 1, an annular concave second reflection mirror 2, and a convex third reflection mirror 3, all of which are arranged on an optical axis X1 of the lighting system 10. The concave first reflection mirror 1 has a parabolic reflective surface with a focus PX at a light source 4a of the discharge lamp 4 to reflect and direct forward part of light beams emanating laterally and radially forward from the discharge lamp 4 in directions parallel to the optical axis X1. The annular concave second reflection mirror 2 is enclosed by an extended surface of the parabolic reflective surface of the concave first reflection mirror 1 and has a quadric reflective surface consisting of a modified ellipsoid. Specifically, the quadric reflective surface is defined by a surface of revolution formed by revolving a segment 2a of an ellipse 2A having a first focus PY1 at the light source 4a on the optical axis X1 and a second focus PY2 on an axis X2 intersecting the optical axis X1 at the focus PX, and hence the first focus PY1, at an angle $\alpha$ around the optical axis X1. The axis X2 is inclined at the angle $\alpha$ so as to place the second focus PY2 of the elliptical segment 2a on one side of the optical axis X1 remote from the elliptical segment 2a. Accordingly, the modified elliptical reflective surface in cross-section including the optical axis X1 has two second focuses PY2 on both sides of the optical axis or the modified elliptical reflective surface has second focuses PY2 on a circle with its center on the optical axis X1. This annular concave second reflection mirror 2 reflects and directs the light beams emanating laterally and radially forward from the discharge lamp 4 at the focus PY1, PX towards the second focuses PY2. The convex third reflection mirror 3, which is sized and positioned so as to face the concave second reflection mirror and not to get in the way of the parallel light beams reflected forward by the convex first reflection mirror 1, has a quadric reflective surface consisting of a modified paraboloid. Specifically, the quadric reflective surface is defined by a surface of revolution formed by revolving a segment 3a of a parabola 3A having a focus PZ at the second focus PY2 of the ellipse 2A and intersecting the optical axis X1 at the angle $\alpha$ around the optical axis X1. Accordingly, the modified parabolic reflective surface in cross-section including the optical axis X1 has a vertex on the optical axis X1. This convex third reflection mirror 3 reflects and direct the light beams reflected by the annular concave second reflection mirror 2 towards the focus PY2 in directions parallel to the optical axis X1.

In the lighting system 10 having the discharge lamp 4 whose light source 4a is positioned at the point on the optical axis X1 which coincides with the focus PX and PY1 the paraboloid of the concave first reflection mirror 1 and the ellipsoid of the annular concave second reflection mirror 2, respectively, Part of the light beams emanating laterally and radially back from the discharge lamp 4 are reflected and directed forward by the concave first reflection mirror 1 in directions parallel to the optical axis X1, and part of the remaining light beams emanating laterally and radially forward are reflected and directed toward the optical axis X1 by the concave second reflection mirror 2 to converge at the focus PY2 of the ellipsoid of the concave second reflection mirror 2 and further reflected directed forward by the convex third reflection mirror 3 whose focus PZ coincides with the focus PY2 of the ellipsoid of the concave second reflection mirror 2 in directions parallel to the optical axis X1.

The facing arrangement of the concave second reflection mirror 2 and the convex third reflection mirror 3, each of which has a modified quadric reflective surface and the incident angle of light beams from the concave second reflection mirror 2 upon the convex third reflection mirror 3 is small relatively to that of the lighting system 10 of the previous embodiment, yields an effect of collecting and incorporating effectively light beams emanating laterally and radially forward from the discharge lamp 4 into the image projection system and increasing the reflectivity of the third convex reflection mirror relative, in particular, to light beams in close proximity to the optical axis X1. Further, the facing arrangement of the second and third reflection mirrors 2 and 3 provides compactness of the lighting system 10, and hence of the image projection system 12 equipped with the lighting system 10.

In the case where the lighting system 10 of the invention is used independently or in cooperation with a projection system which is not always necessary to illuminate an object with parallel light beams, the concave first reflection mirror 1 may be of another aspherical quadric such as an ellipsoid and a hyperboloid to converge or diverge light beams emanating the light source. If an elliptical reflective surface is employed for the concave first reflection mirror 1, it is necessary to employ a hyperbolic reflective surface or a reflection surface modified from the hyperbolic reflective surface for the convex third reflection mirror 3. On the other hand, if a hyperbolic reflective surface is employed for the concave first reflection mirror 1, it is necessary to employ an elliptical reflective surface or a reflection surface modified from the elliptical reflective surface for the convex third reflection mirror 3.

Figure 3:
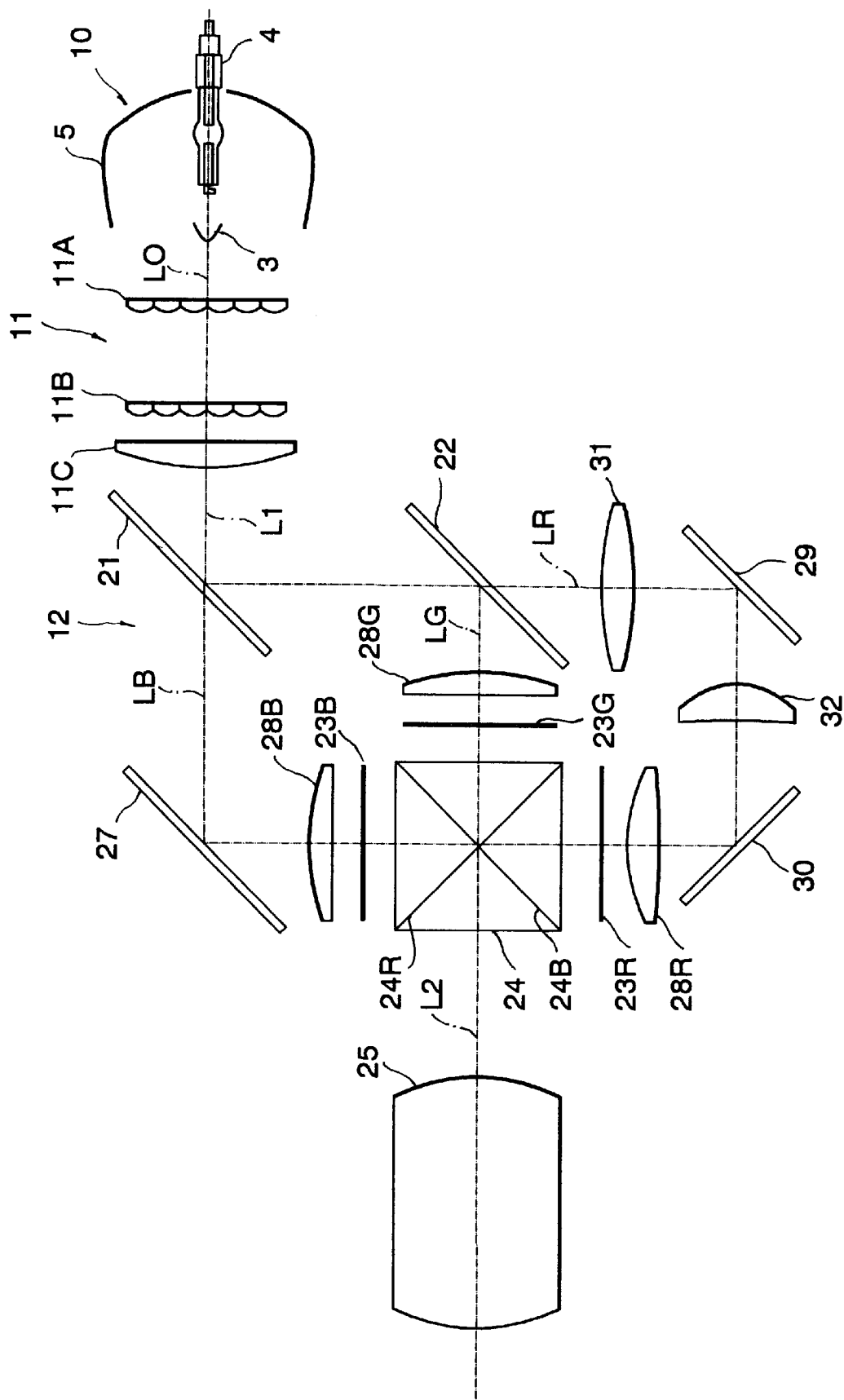
FIG. 3 is a schematic view of an example of a lighting system equipped with the lighting system of the invention.

FIG. 3 shows a practical application of the lighting system 10 to an optical projection device of a video projector equipped with liquid crystal display elements which is hereafter referred to as a LCD video projector for simplicity. The image projection system comprises a lighting system 10 of the invention, an integrator 11 and a projection optical system 12 including a projection lens 25 only schematically shown. The integrator 11, which is disposed between the lighting system 10 and the projection optical system 12, includes two lens arrays 11A and 11B and a condenser lens 11C arranged coaxially with the lighting system 10 to mix light beams LO emanating from the lighting system 10 so as to provide uniform distribution of the light beams. The projection optical system 12 includes three projection optical paths for the three component light beams LB, LG and LR which are formed between the integrator 11 and a color composing prism 24 by two dichroic reflection mirrors 21 and 22. The dichroic reflection mirror 21, which is disposed coaxially with the lighting system 10, transmits only a blue component of the light beams LB and reflects the remaining part of the light beams, thereby separating the blue component light beams LB from the remaining part of light beams. The dichroic reflection mirror 22 is disposed below at a distance from the dichroic reflection mirror 21 equal to a distance between the dichroic reflection mirror 21 and the reflection mirror 27 and in parallel to the dichroic reflection mirror 21 to transmit only a red component of the light beams LR and reflects the remaining part, namely a green component, of the light beams LG, separating the red and green components of the light beams LR and LG B from each other. In the L-shaped blue component light path there are provided a reflection mirror 27 for reflecting the blue light beams LB at a right angle towards the color composing prism 26, a transmission type of liquid crystal display (which is abbreviated to LCD) panel 23B which is driven by a LCD driver (not shown but well known in structure and operation to those skilled in the art) to display a blue image thereon and a field lens 28B disposed between the reflection mirror 27 and the LCD 23B to provide parallel blue light beams. In the L-shaped green component light there are provided a transmission type of liquid crystal display (which is abbreviated to LCD) panel 23G which is driven by the LCD driver to display a green image thereon and a field lens 2BG disposed between the dichroic reflection mirror 22 and the LCD 23G to provide parallel blue light beams. In the U-shaped red component light path there are provided two reflection mirrors 29 and 30 to reflect the red component light beams at a right angle, respectively, towards the color composing prism 26, a field lens 31 and a relay lens 32 disposed before the reflection mirrors 29 and 30, respectively, a transmission type of liquid crystal display (which is abbreviated to LCD) panel 23R which is driven by the LCD driver to display a red image thereon and a field lens 28R disposed between the reflection mirror 30 and the LCD 23R to provide parallel blue light beams. The color composing prism 24, which is of a cross-prism type having a dichroic interface 24B for reflecting blue light beams only and transmitting green light beams and a dichroic interface 24R for reflecting red light beams only, forms a composed multi-color image from three monochromatic component images, i.e. blue, green and red images, projected thereon. While the red component light path LR is different in optical path length from the blue and green component light paths LB and LG which are equal to each other, it is adjusted by the field lens 31 and the relay lens 32 to be apparently consistent with the both blue and green optical path lengths LB and LG. In other words, the field lens 31 and the relay lens 32 are used to focus an image of the light source once before the projection lens 25 so as to put a conjugate point of the blue component optical system consistent with those of the blue and green component optical systems. Many color composing dichroic prisms are well known in the art, and the color composing prism 24 may take any well known type. The composite multi-color image provided by the color composing prism 24 is projected onto a screen (not shown) remote from the projection optical system 12 by the projection lens 25.

In the operation of the image projection system depicted in FIG. 3, light beams LO emanating from the lighting system 10 are first made uniform in quantitative distribution by the integrator 11 and subsequently separated into a blue component of light beams LB from the remaining part including green and red components of light beams LG and LR. The blue component light beam LB passing through the dichroic reflection mirror 21 are further reflected at a right angle by the reflection mirror 27 and directed towards the color composing prism 24. The blue component light beams LB are turned to parallel light beams by the field lens 28B and illuminate the transmission LCD panel 23B on which a blue component image is displayed. The green and red components of light beams LG and LR reflected at a right angle by the dichroic reflection mirror 21 are partly reflected by and partly transmit through the dichroic reflection mirror 22 to be separated into the green component of light beams LG and the red component of light beams LR. The green component light beams LG reflected by the dichroic reflection mirror 22 are turned to parallel light beams by the field lens 28G and illuminate the transmission LCD panel 23G on which a green component image is displayed. The red component light beams LR transmitting through the dichroic reflection mirror 22 are directed into the U-shaped red component light path. While adjusted in optical path length by the field lens 31 and the relay lens 32, the red component light beams LR are reflected by the reflection mirrors 29 and 30. Thereafter, the red component light beams LR are turned to parallel light beams by the field lens 28R and illuminate the transmission LCD panel 23R on which a red component image is displayed.

The three component light beams LB, LG and LR passing through the respective transmission LCD panels 23B, 23G and 23R, respectively and bearing the respective monochromatic component images are directed to the color composing prism 24 where the three monochromatic component images, i.e. blue, green and red component images, are composed as a multi-color image. The composite light beams L2 are focused on the screen by the projection lens 25 to display the multi-color image on the screen.

Figure 4:
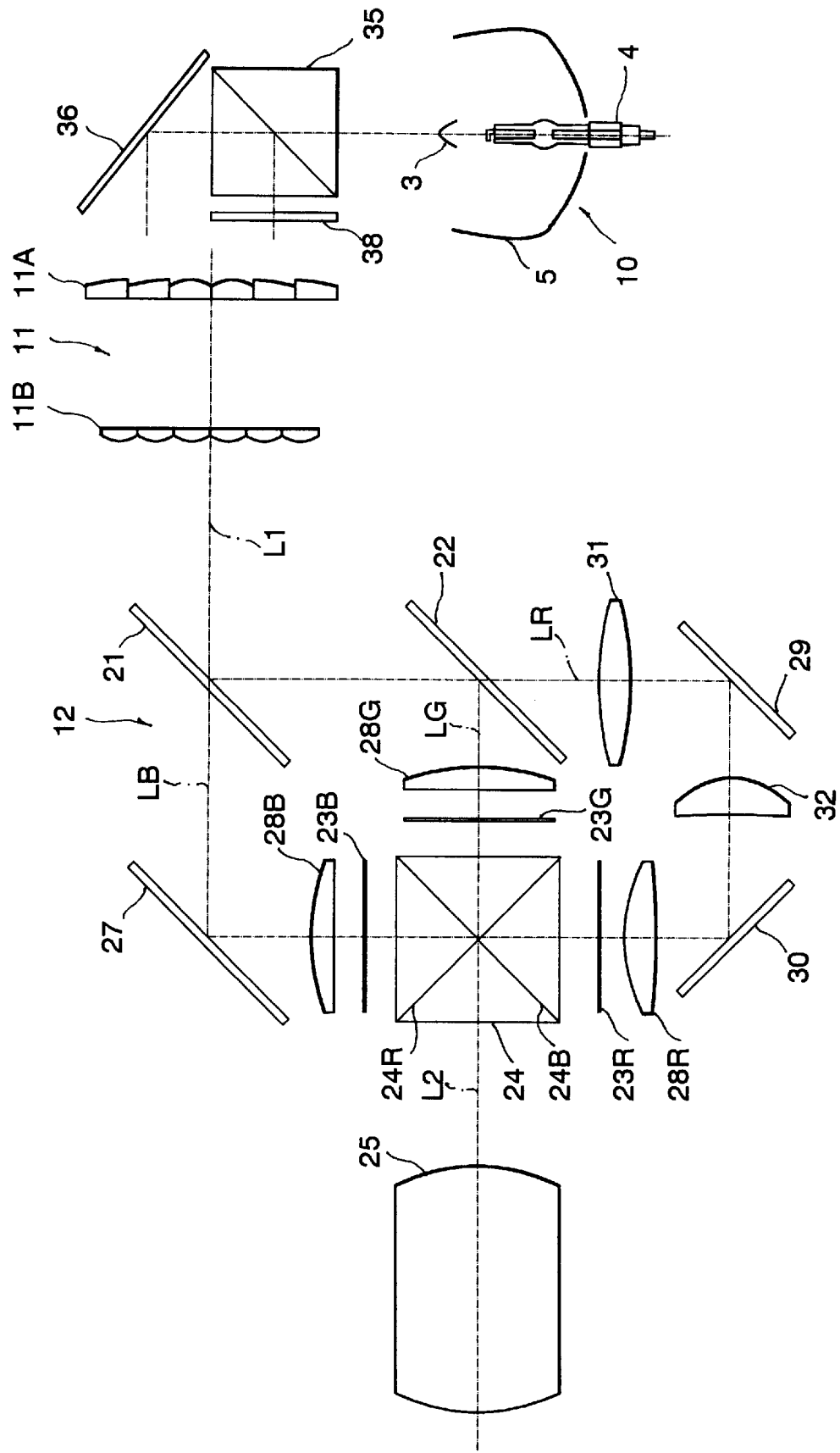
FIG. 4 is a schematic view of another example of a lighting system equipped with the lighting system of the invention.
Figure 5:
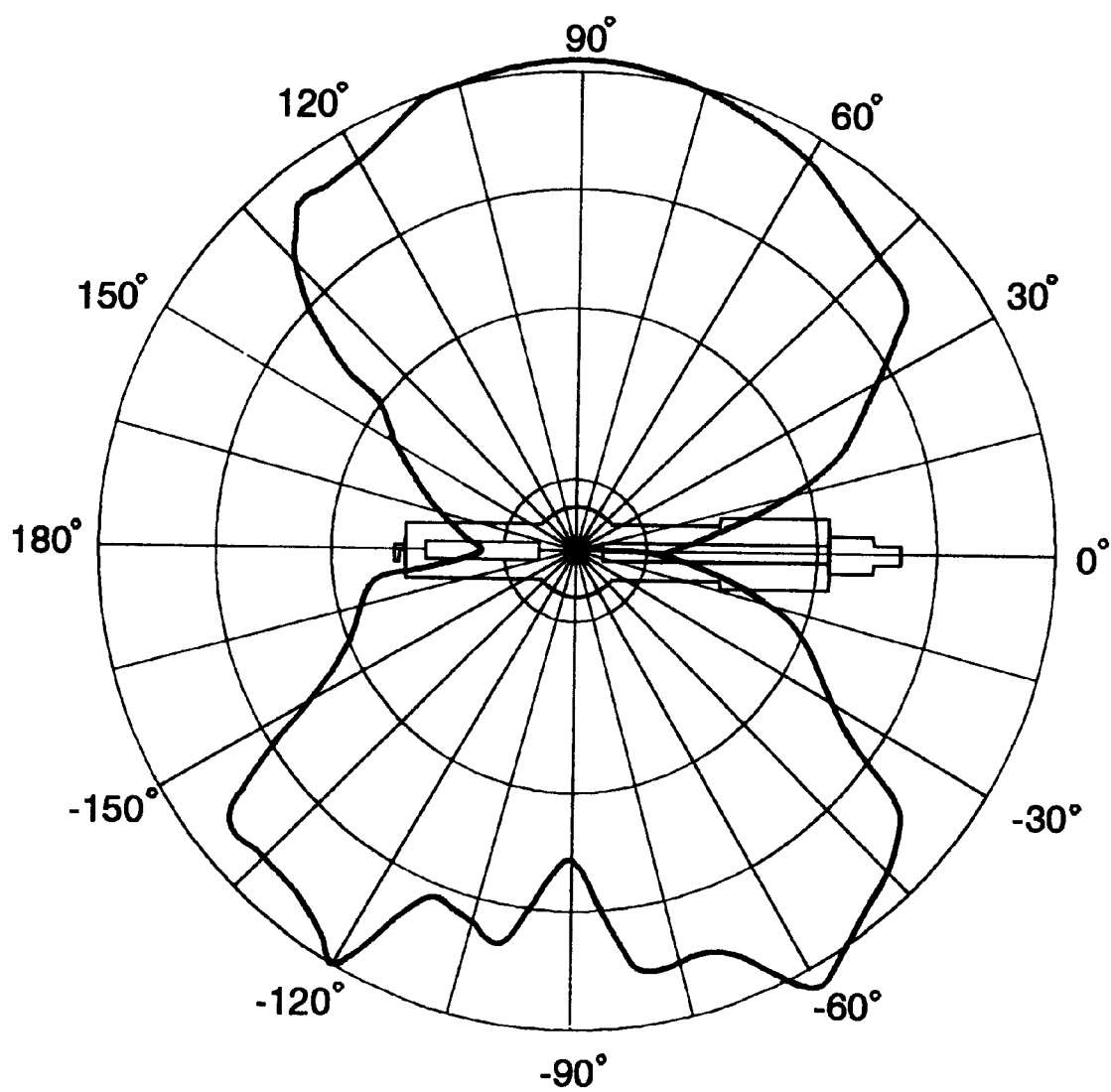
FIG. 5 is a diagrammatic view showing a radiant intensity distribution of a discharge tube.

While light beams LO emanating from the lighting system 10 are directly incorporated into the integrator 11 in the above embodiment, a polarizing optical assembly may be installed after the lighting system 10 with an effect of reducing a light loss as shown in FIG. 4.

Referring to FIG. 4, a polarizing optical assembly is disposed between the lighting system 10 and the integrator 11. The polarizing optical assembly comprises a polarizing beam splitter 35 for reflecting and directing S-component polarized light beams towards the integrator 11 and transmitting P-component polarized light beams and , a half-wave plate 38 for converting S-component polarized light beams to P-component polarized light beams and a reflection mirror 36 for directing the P-component polarized light beams polarized by the polarizing beam splitter 35 towards the integrator 11. Light beams emanating from the lighting system 10 are polarized partly as P-component light beams and partly S-component light beams by the polarizing beam splitter 35. The S-component polarized light beams are reflected by the polarizing beam splitter 35 and further converted to P-component polarized light beams by the half-wave plate 38. The P-component polarized light beams pass through the polarizing beam splitter 35 and are reflected at a right angle by the reflection mirror 36. The P-component polarized light beams are then incorporated into the integrator 11. Since the light beams diverge to some extent due to reflection by the polarizing beam splitter 35 or the reflection mirror 37, the lens array 11A is enlarged corresponding to the divergent angle of the light beams entering the integrator 11. The polarizing optical assembly installed to the lighting system 10 yields improvement of the coefficient of utilization of light beams emanating from the lighting system 10.

It is to be understood that the present invention may be embodied with various changes, modifications and improvements, which may occur to those skilled in the art, without departing from the spirit and scope of the invention defined in the following claims.

What is claimed is:

1. A lighting system equipped with a reflector for reflecting and directing a light beam forward along an optical axis of the lighting system, said lighting system comprising:
   a light source for generating light beams in substantially all-around radial directions; and
   a reflector arrangement having aspherical reflective surfaces for reflecting said light beams forward;
   said reflector arrangement comprising:
      a concave first reflection mirror having an aspherical reflective surface for reflecting and directing forward said light beams emanating laterally and radially back from said light source forward along the direction of said optical axis;
      an annular concave second reflection mirror having an aspherical reflective surface for reflecting and directing said light beams emanating laterally and radially forward from said light source toward a specified point, said annular concave second reflection mirror being continuous from said concave first reflection mirror; and
      a third reflection mirror disposed near said specified point and having an aspherical reflective surface for reflecting and directing forward said light beams reflected by said annular concave second reflection mirror along the direction of said optical axis.

2. The lighting system as defined in claim 1, wherein said aspherical reflective surfaces consist of a quadric surface having at least a focus at a light source point on said optical axis at which said light source is arranged for said concave first reflection mirror, a surface modified from a quadric having a focus at said light source point for said annular concave reflection mirror, and one of a quadric surface having at least a focus at said specified point and a surface modified from a quadric having at least a focus at said specified point for said convex third reflection mirror, each of said concave first reflection mirror and said convex third reflection mirror having a vertex laying on said optical axis.

3. The lighting system as defined in claims 1, wherein said aspherical reflective surfaces consist of a quadric surface having at least a focus at a light source point on said optical axis at which said light source is arranged for said concave first reflection mirror, a surface modified from an ellipsoid having a first focus at said light source point and a second focus at said specified point for said annular concave reflection mirror, and a quadric surface having at least a focus at said specified point, said concave third reflection mirror having a vertex laying on said optical axis.

4. The lighting system as defined in claims 1, wherein said aspherical reflective surfaces consist of a parabolic surface having a focus at a light source point on said optical axis at which said light source is arranged for said concave first reflection mirror, an elliptical surface having a first focus at said light source point and a second focus at said specified point laying on said optical axis for said annular concave reflection mirror, and a parabolic surface having a focus at said specified point, each of said concave first reflection mirror and said convex third reflection mirror having a vertex laying on said optical axis.

5. The lighting system as defined in claims 1, wherein said aspherical reflective surfaces consist of a parabolic surface having a focus at a light source point on said optical axis at which said light source is arranged for said concave first reflection mirror, a surface formed by revolving a segment of an ellipse having a first focus at said light source point and a second focus at said specified point off said optical axis about said optical axis for said annular concave reflection mirror, and a surface formed by revolving a segment of a parabola having a focus at said specified point and intersecting said optical axis about said optical axis, each of said convex first reflection mirror and said concave third reflection mirror having a vertex laying on said optical axis.

6. The lighting system as defined in claim 1, wherein said concave first reflection mirror is formed integrally with said annular concave second reflection mirror.

7. The lighting system as defined in claim 1, and further comprising an integrator for making said light beams reflected forward by said reflector arrangement uniform in quantitative distribution.

8. The lighting system as defined in claim 1, further comprising polarizing means for converting said light beams reflected forward by said reflector arrangement into P-component polarized light beams.

9. The lighting system as defined in claim 8, wherein said polarizing means comprises a polarizing beam splitter for splitting and converting said light beams reflected forward by said reflector arrangement into S-component polarized light beams and P-component polarized light beams and a half-wave plate for converting said S component polarized light beams into P-component polarized light beams.

10. A lighting system for illuminating and composing a multi-color image which is projected on a remote screen, said lighting system comprising:

a light source device for generating light beams in substantially all-around radial directions; and a reflector arrangement having aspherical reflective surfaces for reflecting said light beams forward, said reflector arrangement comprising a concave first reflection mirror having an aspherical reflective surface for reflecting and directing forward said light beams emanating laterally and radially back from said light source forward along the direction of an optical axis of the lighting system, an annular concave second reflection mirror having an aspherical reflective surface for reflecting and directing said light beams emanating laterally and radially forward from said light source toward a specified point, and a third reflection mirror disposed near said specified point and having an aspherical reflective surface for reflecting and directing forward said light beams reflected by said annular concave second reflection mirror along a direction of said optical axis, said annular concave second reflection mirror being continuous from said concave first reflection mirror;

color separation optical means for separating said light beams reflected forward by said reflector arrangement into three primary color component light beams;

an illumination optical system for forming a light path for each said primary color component light beams;

image display means disposed in each said light path for displaying a component image; and color composing optical means for composing said component images illuminated by said primary color component light beams to provide a multi-color image to be projected onto a remote screen.

11. The lighting system as defined in claim 10, wherein said aspherical reflective surfaces consist of a quadric surface having at least a focus at a light source point on said optical axis at which said light source is arranged for said concave first reflection mirror, a surface modified from a quadric having a focus at said light source point for said annular concave reflection mirror, and one of a quadric surface having at least a focus at said specified point and a surface modified from a quadric having at least a focus at said specified point for said convex third reflection mirror, each of said concave first reflection mirror and said convex third reflection mirror having a vertex laying on said optical axis.

12. The lighting system as defined in claims 10, wherein said aspherical reflective surfaces consist of a quadric surface having at least a focus at a light source point on said optical axis at which said light source is arranged for said concave first reflection mirror, a surface modified from an ellipsoid having a first focus at said light source point and a second focus at said specified point for said annular concave reflection mirror, and a quadric surface having at least a focus at said specified point, said concave third reflection mirror having a vertex laying on said optical axis.

13. The lighting system as defined in claims 1, wherein said aspherical reflective surfaces consist of a parabolic surface having a focus at a light source point on said optical axis at which said light source is arranged for said concave first reflection mirror, an elliptical surface having a first focus at said light source point and a second focus at said specified point laying on said optical axis for said annular concave reflection mirror, and a parabolic surface having a focus at said specified point, each of said concave first reflection mirror and said convex third reflection mirror having a vertex laying on said optical axis.

14. The lighting system as defined in claims 10, wherein said aspherical reflective surfaces consist of a parabolic surface having a focus at a light source point on said optical axis at which said light source is arranged for said concave first reflection mirror, a surface formed by revolving a segment of an ellipse having a first focus at said light source point and a second focus at said specified point off said optical axis about said optical axis for said annular concave reflection mirror, and a surface formed by revolving a segment of a parabola having a focus at said specified point and intersecting said optical axis about said optical axis, each of said convex first reflection mirror and said concave third reflection mirror having a vertex laying on said optical axis.

15. The lighting system as defined in claim 10, wherein said concave first reflection mirror is formed integrally with said annular concave second reflection mirror.

16. The lighting system as defined in claim 10, and further comprising an integrator disposed after said light source device for making said light beams reflected forward by said reflector arrangement uniform in quantitative distribution.

17. The lighting system as defined in claim 10, further comprising polarizing means disposed between said light source and said integrator for converting said light beams reflected forward by said reflector arrangement into P-component polarized light beams.

18. The lighting system as defined in claim 17, wherein said polarizing means comprises a polarizing beam splitter for splitting and converting said light beams reflected forward by said reflector arrangement into S-component polarized light beams and P-component polarized light beams and a half-wave plate for converting said S component polarized light beams into P-component polarized light beams.

* * * * *